Patented Mar. 17, 1942

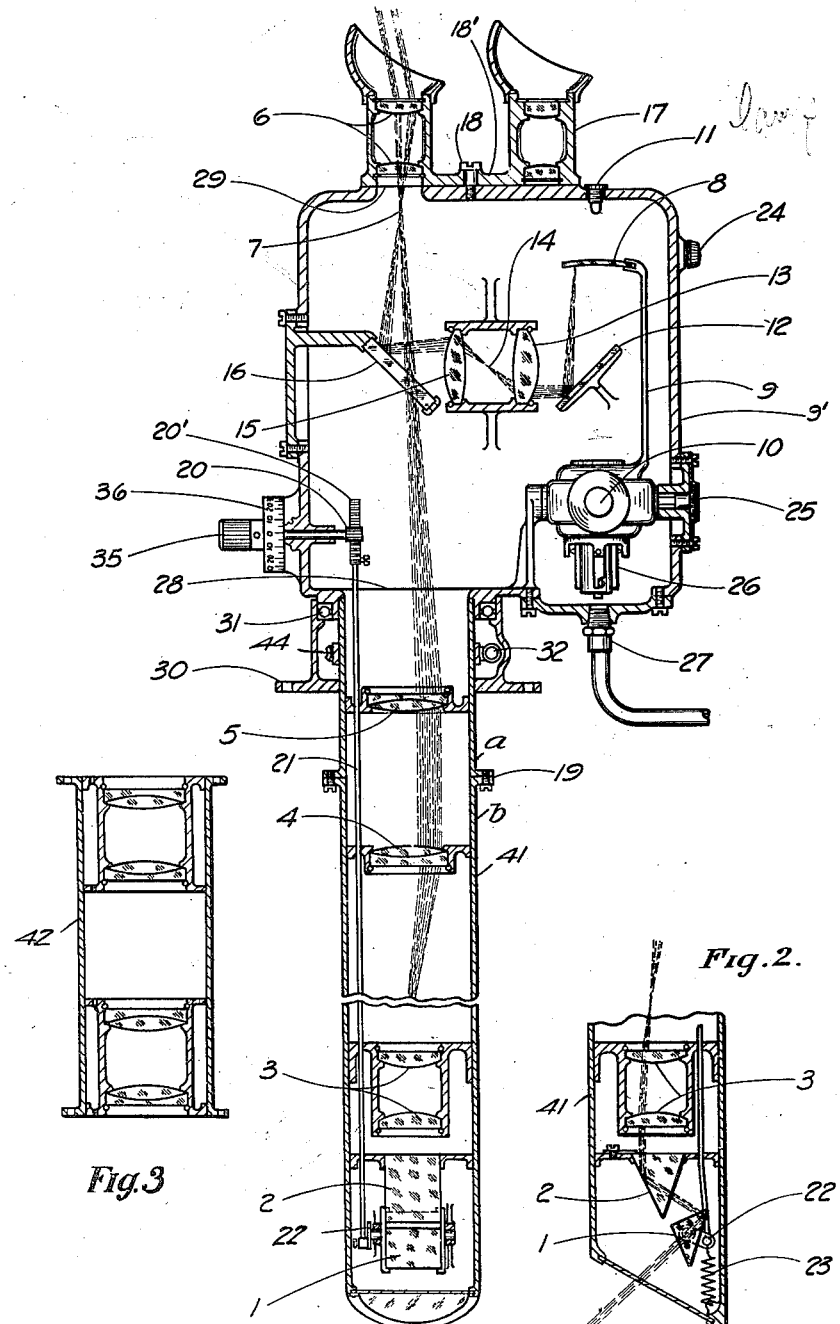

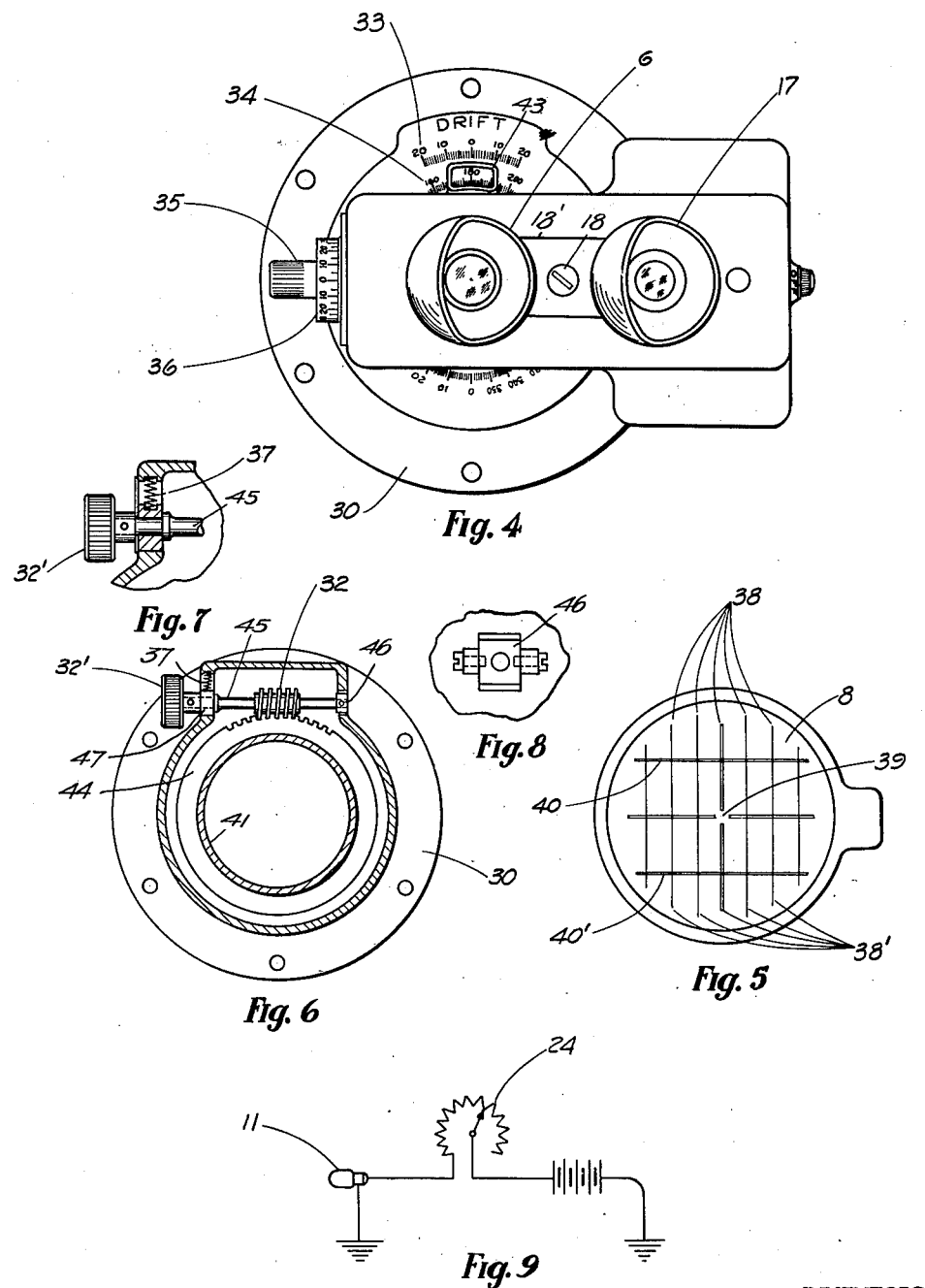

2,276,284

UNITED STATES PATENT OFFICE 2,276,284

DRIFT METER

Samuel M. Burka, Dayton, Ohio, and Carl J. Crane, Montgomery, Ala.

Application March 25, 1939, Serial No. 264,107

7 Claims. (Cl. 88—1)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a stabilized means for obtaining the drift of dirigible craft such as aircraft and also embodies means for determining the ground speed of such craft. The invention is especially designed to overcome the inaccuracies of measuring drift and ground speed such inaccuracies in present types resulting from nonstabilized references which latter are compared optically with the relative movement of the ground or cloud objects for determining drift and/or ground speed.

Another purpose to which this invention may be put is for the determination of true or exact altitude of an aircraft wherein two aircraft each supporting an instrument of the class described herein and embodying the principles shown in this invention are flying in formation but with a known difference of altitude. The solution of two simultaneous equations involving time, altitude, difference of altitude, enable the operators of the two craft, by radio communication to transfer from one to the other information of time and altitude in order that the true altitude of the lower or higher craft may be definitely established independent of pressure and temperature conditions which may exist.

Another purpose of the presently described invention is its use in the determination of bearings such as in marine practice is done with a pelorus or bearing plate. For the above problem we employ a gyro stabilized reference, such gyroscope embodied being preferably of the self-erecting type although this is neither necessary nor essential to the satisfactory performance of an instrument of this kind.

Due to its precessional characteristics, it is impossible to apply any load to a gyro and have it maintain its axis fixed. All attempts to use a gyro to stabilize or hold vertical any instrument have failed since any load or force applied to the gyro causes it to precess; i. e., tilt its axis at right angles to the load.

We achieve gyro-stabilization by making the reticle integral with the gyro and thereby having the gyro do no work. A novel arrangement of the optics of the instrument and the radius of apparent motion of the reticle then permits the whole instrument to be tilted without destroying the coincidence of the true vertical line of sight and the center of the reticle system. In other words, the ground image and the reticle automatically maintain the same relative positions regardless of whether the instrument axis is vertical or not.

Previous drift meters having means for sighting backward have had bulky mechanisms, have required large holes in the aircraft and have been limited by the aircraft structure to small angles particularly in azimuth and have all been limited by their optical design to a predetermined size necessitating an individual design for each size or type of airplane.

By a novel combination of few lenses and a fixed and movable prism assembly, we obtain a meter in which all the lower parts are in a single tube, thus requiring only a small hole in the aircraft and yet achieves the possibility of complete visibility throughout the lower hemisphere and permits both drift and bearing measurements to be made and read on a single index as drift right and left or as relative bearing from 0 to 360 degrees. By means of a joint in the meter at the position where the rays are in parallel pencils, adjustable length is achieved so that without change in design the meter is adaptable for installation in large and small aircraft.

In the preferred form of subject drift and ground speed meter, it is a gyro stabilized periscopic instrument provided with features embodying an erect image, a trail sighting feature, illuminated reticle, bearing and drift scales, and combines features of variable magnification in order that drift and ground speed may be read at high and low altitudes and further embodies features of extensibility in length, making the instrument applicable to both large and small aircraft.

The meter consists essentially of two telescopes inversely positioned with respect to each other and placed in line with a movable prism at the entrance pupil to change the direction of the line of sight. The reticle or reference grid through means of which the ground is observed for comparative movement forms a part of the self-erecting gyroscope itself by being attached thereto and is viewed simultaneously with the image of the ground. The stabilized characteristic of this instrument is achieved by the fact that the combination of the gyroscopic stabilization and optical system is so arranged that the images of the reticle and of the ground move in the same direction and in the same amount when the whole instrument which is fixed to the airplane is tilted.

Referring to the drawings—Figure 1 shows the essential operating characteristics, optical system and gyroscope in vertical section.

Figure 2 shows in vertical section the movable prism at the entrance pupil, this figure being representative of the lower end of Figure 1 but rotated through 90°.

Figure 3 is a vertical section of the extension tubing with optical system which may be used to increase the length of the drift meter.

Figure 4 is a plan view of the instrument showing eyepiece and scales for reading drift and bearing of an object and also shows the handle used by the operator in adjusting the prism at the entrance pupil.

Figure 5 is a detail view of the reticle showing the markings on the latter by means of which ground objects are tracked for the determination of drift, ground speed, and for the measurement of bearings.

Figure 6 is a sectional view, on line 6—6 of Figure 1, illustrating the worm and gear for rotating the drift meter through small angles for precise measurements.

Figure 7 is a fragmentary view showing in greater detail the spring arrangement which holds the worm in mesh with the gear illustrated in Figure 6.

Figure 8 is a detail view which shows the pivot end of the worm shaft illustrated in Figure 6.

Figure 9 is a diagrammatic view of the lamp circuit for illuminating the reticle.

From the drawings it will be seen that light from a ground object passes through the movable prism 1, the fixed prism 2, the objective lens 3 and lens 4 of the first telescope; thence through lens 5 of the second telescope and is imaged at 7. The eyepiece 6 views this image. The two telescopes separately form inverted images so the image as viewed through the combination is an erect one, the inversion produced by the prism 1 being corrected by reflection in prism 2.

The reticle 8 may be placed in the plane 7 or be imaged in this plane as is shown in the preferred form of the invention in Fig. 1, in which case the reticle 8 is supported on arm 9 which in turn is attached to the gyroscope 10. Illumination of the reticle 8 is achieved by artificial illumination from the lamp 11, shown in Figures 1 and 3, the intensity of the illumination being controlled by rheostat 24. Light from points of the reticle are reflected by the mirror 12 through lens 13 and imaged at 14. The light then passes through lens 15, is reflected from the clear glass reflector 16 and an image is formed at 7. This image will be viewed with the ground image by the eyepiece 6. It will be seen that, since the arm 9 is maintained in position by the gyroscope, when the entire instrument is tilted the ground image and the reticle image will move in the same direction across the eyepiece field. The length of the arm 9 and the focal length of lenses 13 and 15 can be chosen in relation to the focal length of the lenses 3, 4 and 5 in order to fulfill the requirement for equality of amount and movement of the two images. In the preferred embodiment of the invention as illustrated, this end may be accomplished by placing the reticle 8 and the plane 7 at conjugate focal points of the lens system 13—15; one conjugate focal distance—from plane 7 to the nodal point of the lens system 13—15—being made equal to the equivalent focal length of the lens system which forms an image of an observed object in the focal plane 7; the other conjugate focal distance—from 8 to the said nodal point—being equal to the radius of pivotation of said reticle.

Variable magnification is secured by a simple arrangement of interchangeable eye-pieces 6 and 17 of different magnifying powers. These eyepieces are mounted on a common support 18' rotatable about a pin 18 on the top of the instrument case 9'. By rotating the eyepiece support 18' through an angle of 180 degrees about the pin 18, the eyepiece 17 is placed in the position shown occupied by eyepiece 6 of Fig. 1.

The rays emerging from lens 4 are in parallel ray bundles the separate bundles being slightly divergent and hence the separation of lens 5 and 4 is not critical and, within limits dependent upon the divergence of separate bundles, the instrument may be parted between the lenses 5 and 4, such as at the flanged joint 19 between the sections $a$ and $b$ of the tube 41 and spacers inserted between the flanges to secure the length required for the instrument without changing its optical or other characteristics.

However, for great changes of length the conventional unit power erecting telescope of the required length such as shown at 42 in Fig. 3 may be inserted after separating the instrument at the point 19.

Operation of the trail sighting feature, which feature permits an observer, looking into the instrument, at the eyepiece 6 down the vertical axis of the drift meter, to observe an object any place from directly below the aircraft to any position on a line substantially on or slightly above the horizon. This is accomplished by rotating operating handle 35. Attached to the handle 35 by its shaft is pinion 20 which engages rack 20' and which by means of shaft 21 and counter-shaft 22 rotates the prism 1 about its axis in order to change the line of sight of the operator. As described above an observer may view objects from a point directly below or slightly ahead of the airplane to any point in a vertical plane as far back as or substantially slightly above the earth's horizon. Spring 23 loads the operating system of the prism in order that the long shaft 21 will not have to take a load of compression and thereby destroy the accuracy of the trail sighting reading as shown on the scale 36.

Although the gyroscope 10 shown in the preferred form of the invention is of the conventional self-erecting air driven type it need not be of this particular type and in fact it need not be of the self-erecting type in order that the present invention may satisfactorily accomplish the desired end. The gyroscope 10 may actually take the form of a balanced gyroscope with three degrees of freedom supplied with suitable caging mechanism which will permit caging and uncaging of the gyroscope coincidental with non-use and use respectively in the measurements of drift or ground speed. In the present form of gyroscope the air is withdrawn from the closed case 9' through the tube 27 and air to replace that withdrawn enters through gimbal rings at the position 25 to drive the gyro wheel and thence through the erecting system 26. In order that the case 9' may be maintained air tight with the exception of the air entry passage 25 and air exit passage 27, glass plates may be provided at the openings 28 and 29 for sealing the instrument. The instrument is mounted vertically in the aircraft on flange 30 and is rotated in azimuth on the bearing 31. On the flange 30 are the scales 33 and 34 graduated to read drift angles and bearings, respectively, with respect to the fore-and-aft axis of the aircraft. These scales are read by a single index 43 on the instrument. The meter is rotated through small angles for precise measurements by a worm and gear mechanism such as shown in detail in Figures 6 to 8 inclusive. The gear 44 of the mechanism is fixed to the upper section of the instrument tube 41 and the tangent screw or worm 32 is integral with a shaft 45 journaled for rotation in the flange 30. To enable the worm and gear to be disengaged so that the instrument can be turned rapidly through large angles, the worm shaft is supported at one end in a pivoted bearing 46 and at the other end in a slide bearing 47. Normally, the worm and gear are held in mesh by the pressure of a spring 37 pressing against the slide bearing 47. A suitable knob 32' is provided on the outer end of the worm shaft to facilitate turning the same about its axis or swinging it on its pivot.

In normal operation during flight the navigator of the airplane will view the image of the ground, water or low lying fog clouds through the eyepiece. The points on the ground are normally at such a distance from the drift meter that rays of light emanated from each point on the ground are received in the drift meter in parallel bundles, the separate bundles being more or less highly divergent, depending upon their relative positions in the field of view. While so doing proper illumination is placed on the reticle 8 in order that while viewing the image of the ground the navigator will at the same time view the image of the stabilized reticle 8. As the aircraft pursues its constant heading, if there is no drift, the image of objects on the ground will move parallel to the lines 38 and 38'. If drift does, however, exist the image of the ground or surface objects will not move parallel to these lines and the navigator therefore will rotate the instrument on the bearing 31 until the image of the surface objects is travelling parallel along the lines 38 and 38'. Since the reticle 8 is gyro stabilized, this movement will be smooth and free from the usual annoying oscillations witnessed in a non-stabilized drift meter. After observing, assuming that the surface objects are moving parallel to the lines 38 and 38', the navigator reads on the drift scale of Fig. 4, the drift which is representative of the angle between the longitudinal axis of the airplane and the course or track of the airplane over the ground. The drift scale reads from 0 degrees to the right and to the left. If, however, the aircraft is in flight over water and the water is so smooth that no definite object can be tracked or imaged on the reticle for observing its movement with respect to the lines 38 and 38', an object may be dropped from the airplane and viewed at the position 39. Since it is obvious that as the airplane proceeds through the air the object which was dropped will become farther and farther behind the airplane the means for trail sighting described above are necessary in order that the image of the object dropped to the surface may be held to the position 39, by means of the operating handle 35 which connects with the prism 1. By maintaining the image of the object to the position 39 and rotating the drift meter on the bearing 31, a suitable determination of drift will be obtained which will be measured on the drift scale 33.

In a like manner the drift meter may be rotated on its bearing and the image or any object visibly placed at the position 39. For instance, a distant mountain peak or low lying celestial body may be observed through the drift meter and its image placed at 39 of the reticle 8 of Fig. 5, as described above, and when this objective has been completed, the bearing from the head of the aircraft to the object will be measured on the bearing scale 34 which bearing scale is preferably graduated from 0 to 360° and permits the measurement of bearings taken either left or right throughout this range. By the use of the lines 40 and 40' the time it takes the image of a surface object passed over, to travel from the line 40 and 40' is a measure of the ground speed of the aircraft. The altitude being known the ground speed can be determined by the time interval elapsed between observing the image of a ground object on the line 40 and subsequently on line 40'. In a like manner the ground speed of the aircraft may be determined by the use of the trail sighting feature which permits the operator to view an object immediately below the aircraft and at some time interval later to view it after it has reached a position in trail in the airplane, both readings being made on the center line which passes through the position 39 of the reticle 8.

It is obvious that rod 21 will be of such a length as to correspond with the length of the instrument when modified by the use of spacer elements or other means to increase its length.

It is also obvious that sections $a$ and $b$ may be separable in a variety of ways, for instance, $a$ and $b$ may be arranged to telescope one over the other and held in adjusted position by suitable clamping means such as a friction clamp.

Should two airplanes fly near each other, each at a constant, but unknown, altitude and ground speed and then by use of the subject invention observe a dropped object on the surface subsequently timing the passage of the image between the lines 40 and 40', the true altitude of the higher aircraft will be $$h_1 = \frac{Sh \times t_1}{t_1 - t_2}$$

in which $h_1$ represents the higher altitude and $Sh$ the difference in altitude between the two craft. The time of passage of the image between the lines 40 and 40' of the higher craft is $t_1$ while that for the lower is $t_2$.

Having now described the invention what we claim and desire to secure by Letters Patent is:

1. A drift meter for aircraft, comprising a sighting tube, means for supporting said sighting tube for rotation about a longitudinal, substantially vertical axis, optical means for transmitting and focusing in a given focal plane in the line of sight of said tube, images of observed terrestrial objects, a gyroscope, a gimbal ring mounting for said gyroscope, a reticle carried by said gyroscope to pivot about said gimbal ring mounting, optical means for transmitting and focusing an image of said reticle in the said given focal plane with the said images of terrestrial objects and with the same orientation, the radius of pivotation of the grid reticle being so selected with respect to the focal lengths of the optical systems as to produce, upon tilt of the said drift meter, equality of movement in the same direction of the reticle and ground images.

2. A drift meter for permanent installation in different size aircraft with one end positioned so that exterior objects may be observed therethrough, and the other end positioned interiorly thereof in observing position, comprising a sighting tube, means supporting said sighting tube for rotation about a longitudinal substantially vertical axis, objective optical means for receiving bundles of rays from objects at such a distance from the one end that the rays from each point are parallel, bundles from separate points being widely divergent depending upon their position in the field of view, said objective optical means serving to magnify the images to a high degree of magnification and direct the rays into the sighting tube in bundles of parallel rays with the rays of separate bundles being slightly divergent, eyepiece optical means for receiving and focusing the bundles of image-carrying rays, the sighting tube being extensible where the bundles of image-carrying rays are slightly divergent, whereby the drift meter may be adapted for different aircraft.

3. A device as recited in claim 2 and further including means extensibly connecting said sighting tube where the light rays are transmitted in bundles of rays which are only slightly divergent.

4. A device as recited in claim 2 and further including means of separably connecting said sighting tube whereby light rays are transmitted in bundles of rays which are only slightly divergent, and a spacer element comprising a unit power erecting telescope for connecting said separated portions.

5. A drift meter for permanent installation in different size aircraft with one end positioned so that exterior objects may be observed therethrough and the other end positioned interiorly thereof in observing position, comprising a sighting tube, means for supporting said sighting tube for rotation about a longitudinal substantially vertical axis, objective end optical means for receiving widely divergent bundles of parallel image-carrying rays, magnifying them to a high degree of magnification and transmitting them through the sighting tube in bundles of parallel image-carrying rays with a slight angle of divergence between separate bundles, a gyroscope, a gimbal ring mounting for said gyroscope, a reticle carried by said gyroscope to pivot about said gimbal ring mounting, eyepiece end-optical means for receiving and focusing in a given focal plane said bundles of image-carrying rays, optical means for transmitting and focusing in the said given focal plane an image of said reticle, said last-named image having the same orientation as the image formed by the said eyepiece-end optical means, the radius of pivotation of said reticle being so selected with respect to the focal lengths of the said optical systems as to result in equality of movement in the same direction of said reticle and ground images.

6. A drift meter for aircraft, comprising a sighting tube, means supporting said sighting tube for rotation about a longitudinal, substantially vertical axis, optical means for transmitting and focusing in a given focal plane in the line of sight of said tube, images of observed terrestrial objects, a gyroscope, a gimbal ring mounting for said gyroscope, a reticle carried by said gyroscope to pivot about said gimbal ring mounting, optical means for transmitting and focusing an image of said reticle in the said given focal plane, and with the same orientation as the said images of terrestrial objects, said plane and reticle being located at conjugate focal points of said last named optical system, one conjugate focal distance being equal to the equivalent focal length of said first named optical system and the other of said conjugate focal distances being equal to the radius of pivotation of said reticle.

7. A drift meter for permanent installation in different size aircraft with one end in exterior-object observing position and the other end interiorly thereof in observing position, comprising a sighting tube, means supporting said sighting tube for rotation about a longitudinally substantially vertical axis, said one end including objective optical means comprising a high powered telescope for receiving separate bundles of parallel image-carrying rays coming from widely separated observed points and having relatively great angles of divergence between separate bundles, the objective optical means focusing the separate bundles of rays and directing them toward the said other end with a slight angle of divergence between separate bundles, said other end including an eyepiece optical system comprising a second high powered telescope inversely positioned with respect to said first named telescope, for receiving and focusing in a given plane the said image-carrying rays with the objects imaged in their normal relative positions in a field of predetermined size such that objects are readily discernible therein.

SAMUEL M. BURKA.
CARL J. CRANE.